Patented June 12, 1923.

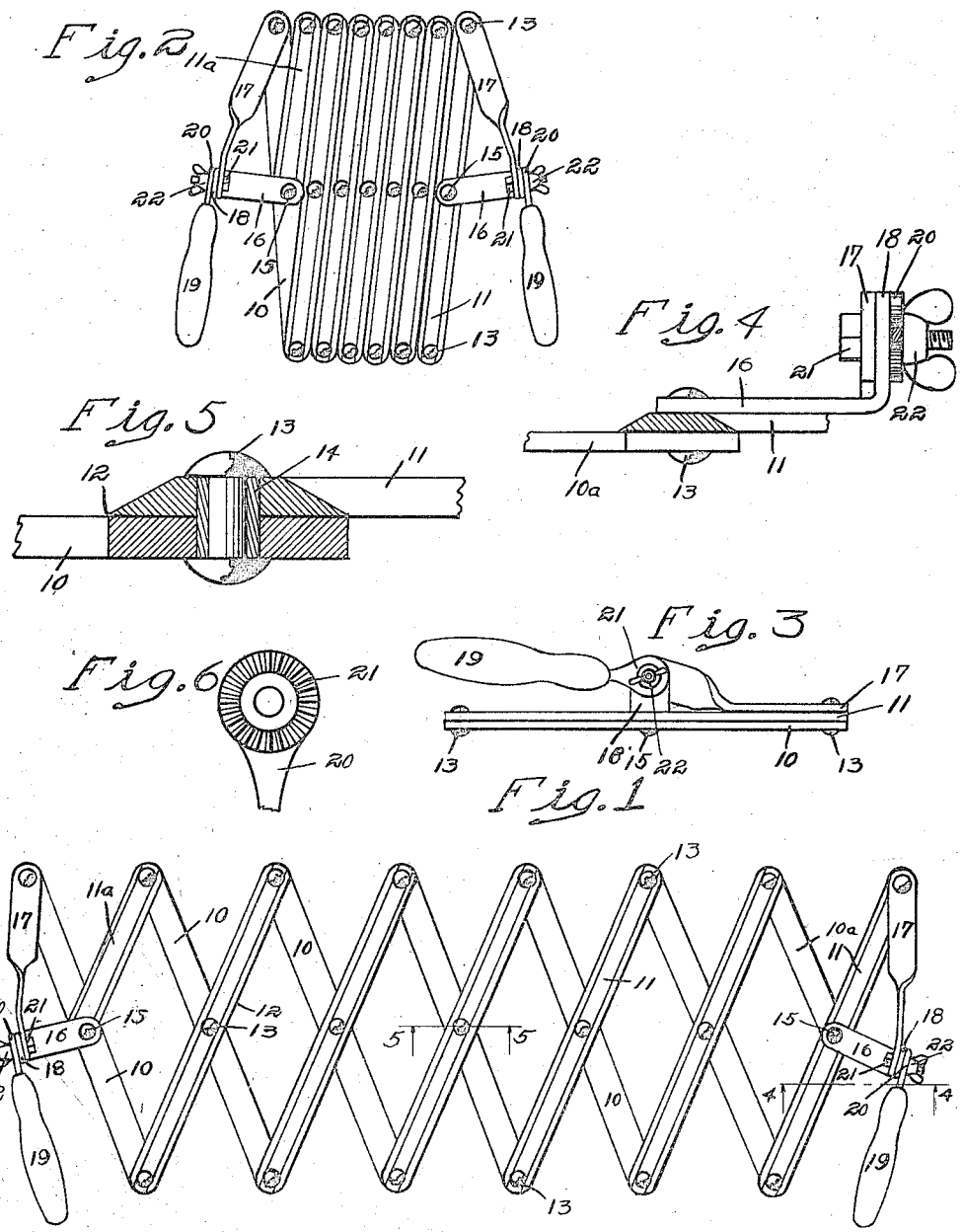

1,458,407

UNITED STATES PATENT OFFICE.

ESTUS J. HAWKS, OF AMES, IOWA.

CLIPPING SHEARS.

Application filed February 24, 1922. Serial No. 539,003.

*To all whom it may concern:*

Be it known that I, ESTUS J. HAWKS, a citizen of the United States, and a resident of Ames, in the county of Story and State of Iowa, have invented a certain new and useful Clipping Shears, of which the following is a specification.

The object of my invention is to provide a clipping shears of simple, durable and inexpensive construction.

A further object is to provide a clipping shears having a large capacity for each stroke, and so constructed and arranged as to make it easy to cut a hedge or the like, so as to leave a properly trimmed outline.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a top or plan elevation of a clipping shears embodying my invention, standing in open position.

Figure 2 shows a similar view with the shears in closed position.

Figure 3 shows an end elevation of the same.

Figure 4 shows a detail, sectional view taken on the line 4—4 of Figure 1.

Figure 5 shows a detail, sectional view taken on the line 5—5 of Figure 1; and

Figure 6 shows a detail view of one end of one of the handles.

My improved clipping shears has in general the form of a lazy tongs lever. The shear blades, which are indicated in the accompanying drawings by the reference characters 10 and 11, are arranged in a series of pairs.

Each blade 11 has sharpened edges 12. Each pair of blades 10 and 11 is pivoted together at the longitudinal centers of the blades, as at 13.

In Figure 5, I have shown a method of connecting the pair of blades. The pivot rivet or the like 13 is extended through the blades 10 and 11 and is mounted within a hardened steel bushing 14.

Each blade 11 is pivoted at its outer ends in a similar way to the adjacent blade 10 of the next pair of blades, as clearly shown in Figure 1.

At one end of the shears, there is provided a half blade 11ª and at the other end a half blade 10ª, as shown in Figure 1.

The pivot pin or rivet 15, which connects the blade 11ª with the center of the outer blade 10 at one end of the shears is elongated and mounted thereon is a handle supporting member 16.

The corresponding pivot pin or rivet 15 at the other end of the shears has mounted thereon a similar handle support 16.

Pivoted to one end of the end blade 10 is a connecting member 17, shown in Figure 1. Pivoted to the corresponding end of the blade 11 at the opposite end of the shears is a similar connecting member 17.

Each handle supporting member 16 has at its outer end a lateral extension 18.

At each end of the shears, I provide a handle 19, having at one end a member 20 provided with a roughened or toothed face 21 adapted to coact with the similar face of the extension 18.

Extended through the members 17, 18 and 20 is a bolt 21 at each end of the shears, having on its end a thumb nut 22.

The members 16 are preferably arranged substantially at right angles to the respective blades 10 and 11 to which they are pivoted, as shown in Figure 1, so that when the shears are collapsed or in folded position, as illustrated in Figure 2, the handles will project away from the shears, whereas when the shears are in extended or open position, the handles will be inclined toward the shears, as shown in Figure 1, thus making it possible for the operator to effect the opening and closing movement of the shears with a minimum movement of the arms and hands.

The handles 19 may be tilted slightly by loosening the nuts 22 and shifting the handles on the screw bolts 21.

It will be seen that in the practical use of my improved shears, where a hedge or the like is being trimmed, the shears may be moved to their open or expanded position, as illustrated in Figure 1, and then moved toward the hedge or the like to permit the material to be cut off to enter between the blades, and when the shears are moved toward collasped position, the trimming operation will be effected.

I have found that with my shears I can trim a hedge row or the like much more rapidly than can be done with shears heretofore in use.

It is obvious that some changes might be made in the details of the structure and arrangement of my improved shears without departing from the real purpose and spirit of my invention, and it is my intention to cover by my claims, any modified forms of structure, or use of mechanical equivalents, which may be reasonably included within their scope.

I claim as my invention:

1. A shears having generally the form of a plurality of lazy tong levers, the members of which are in the form of coacting blades, one edge of each pair of coacting edges being sharpened, handles mounted on the end blades of said shears.

2. A shears having generally the form of a lazy tongs lever, the members of which are in the form of coacting blades, one edge of each pair of coacting edges being sharpened, handle supporting members pivoted to the end blades and projecting endwise of the shears therefrom, a member secured to each end blade and secured to the adjacent handle supporting members, and a handle mounted on each handle supporting member.

3. A shears having generally the form of a lazy tongs lever, the members of which are in the form of coacting blades, one edge of each pair of coacting edges being sharpened, handle supporting members pivoted to the end blades and projecting endwise of the shears therefrom, a member secured to each end blade and secured to the adjacent handle supporting members, and a handle mounted on each handle supporting member for adjustment to various positions.

Des Moines, Iowa, August 10, 1921.

ESTUS J. HAWKS.